United States Patent [19]

Gharakhanian

[11] Patent Number: 5,648,972
[45] Date of Patent: Jul. 15, 1997

[54] V.35 INTEGRATED CIRCUIT TRANSCEIVER WITH DIAGNOSTICS LOOPBACK

[75] Inventor: Al Gharakhanian, Redwood Shores, Calif.

[73] Assignee: Exar Corporation, Fremont, Calif.

[21] Appl. No.: 500,758

[22] Filed: Jul. 11, 1995

[51] Int. Cl.⁶ .................................................. G01R 31/28
[52] U.S. Cl. ......................................... 371/20.5; 371/20.6
[58] Field of Search ................................ 371/20.5, 20.6, 371/20.1, 42, 5.4; 370/14, 15, 16, 16.1, 53, 100.1, 112; 379/1, 5

[56] References Cited

U.S. PATENT DOCUMENTS

| | | | |
|---|---|---|---|
| 4,367,549 | 1/1983 | Vachee | 370/91 |
| 5,210,740 | 5/1993 | Anzai et al. | 370/16 |
| 5,331,672 | 7/1994 | Evans et al. | 375/8 |
| 5,414,712 | 5/1995 | Kaplan et al. | 371/15.1 |

*Primary Examiner*—Robert W. Beausoliel, Jr.
*Assistant Examiner*—Trinh Tu
*Attorney, Agent, or Firm*—Townsend and Townsend and Crew LLP

[57] ABSTRACT

A single integrated circuit transceiver on a single substrate which can perform synchronous data transmissions that comply with CCITT recommendation V.35 in either the DTE or DCE mode is provided. The same chip can be configured to provide a diagnostics loopback, with the loopback being performed one way for a DTE mode and another way for a DCE mode. The invention provides a simple, elegant solution which minimizes the number of gates and maximizes the benefits.

8 Claims, 4 Drawing Sheets

DTE MIRRORED LOOPBACK 5,648,972

V.35 INTEGRATED CIRCUIT TRANSCEIVER WITH DIAGNOSTICS LOOPBACK

BACKGROUND OF THE INVENTION

The present invention relates to integrated circuit transceivers for use with transmission lines, in particular, transceivers complying with CCITT recommendation V.35 which are configurable in either a DTE or DCE mode.

Computer terminal equipment communicates with remote access devices via a differential, twisted-pair line. A standard for one such configuration is CCITT V.35. This standard sets forth a differential pair for both transmission of data and reception of data, along with a transmission clock, a receive clock, and a transmit clock echo. The device originating the transmission and the original clock is referred to as the Data Communication Equipment (DCE) and the end of the transmission line receiving the transmissions and the clock is referred to as the Data Terminal Equipment (DTE). Transceiver integrated circuits have been developed to provide the transmitters and receivers needed for the interface at both ends of the transmission line to convert from CMOS/TTL input levels into a differential pair for transmission.

In the loopback diagnostic mode, it is desirable for either end to be able to send out and receive back signals to test both its own output and the transmission line. This can be accomplished with multiple discrete logic devices to intercept the signal at the other end and reroute it back over the transmission line on the appropriate path. Different discrete logic is required for both the DTE and DCE ends because of the different paths that are looped back. For instance, the DCE always originates the transmission clock, and the DTE is the one that normally provides the clock echo back in normal operation.

SUMMARY OF THE INVENTION

The present invention provides a single integrated circuit transceiver on a single substrate which can perform synchronous data transmissions that comply with CCITT recommendation V.35 in either the DTE or DCE mode. The same chip can be configured to provide a diagnostic loopback, with the loopback being performed one way for a DTE mode and another way for a DCE mode. The invention provides a simple, elegant solution which minimizes the number of external gates and maximizes the benefits.

In particular, the present invention provides a control circuit which generates a first set of control signals for a DCE diagnostics loopback mode, and a second set for a DTE diagnostics loopback mode. In both modes, the data transmitters and data receivers are disconnected from their inputs and outputs, and instead the receiver circuit is fed back to the transmitter. In a DCE mode loopback, the DCE receiver which normally receives the clock echo signal is connected back to the transmitter for the receive clock. The transmit clock continues to be connected through from the DCE to the DTE as in normal operation. In DTE mode, the receiver for the transmit clock is connected back to the input of the transmitter normally used for the clock echo, with the clock echo signal being disconnected from the input pin. The receiver for the clock from the DCE continues to be connected to its output, and is also connected to the receive clock output pin in this configuration.

The preferred embodiment of the present invention is accomplished with only four multiplexers, with three of the multiplexers having only two inputs. Three select signals, already present in an existing prior art transceiver, are used. Select combinations left undefined in normal mode are used to configure the multiplexers for the desired diagnostics loopback, either DTE mode or DCE mode. The present invention maintains the same pin count used for an existing transceiver IC without loopback, thus making the circuit backward compatible to installed systems.

For a fuller understanding of the nature and advantages of the invention, reference should be made to the ensuing detailed description taken in conjunction with the accompanying drawings.

DESCRIPTION OF THE PREFERRED EMBODIMENT

Figure 1:
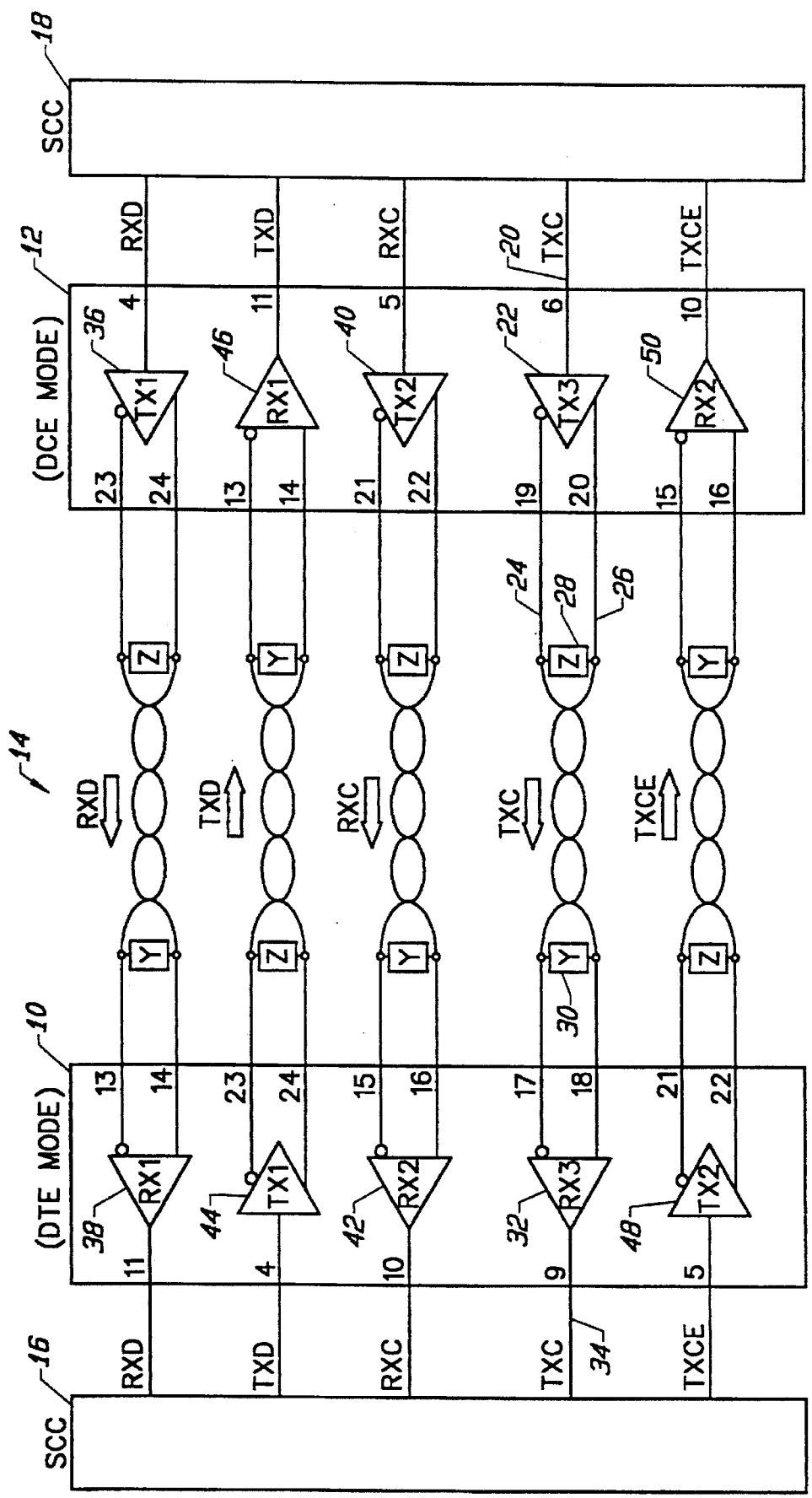
FIG. 1 is a diagram of a standard transceiver configuration in integrated circuits according to the prior art.

FIG. 1 illustrates an existing V.35 transmission line connection using two prior art transceiver chips 10 and 12. Typically, transceivers 10 and 12 would each be the same chip design, but connected differently. In between chips 10 and 12 is a transmission line 14, illustrated as five twisted-pair differential lines, with two for data and three for clocks. On the other side of the transceivers 10 and 12 are Serial Communication Controllers (SCC) 16 and 18. DCE mode transceiver 12 would typically be connected to a device 18 (typically connected to a computer) which generates receive and transmit synchronization signals by issuing a clock signal, the transmit clock TXC on a line 20. This is provided as an input to DCE mode transceiver chip 12, connected through TX3 transmitter 22. Transmitter 22 provides a differential output on lines 24 and 26 through a source impedance 28 and termination impedance 30 to a RX3 receiver 32 in DTE transceiver 12. Receiver 32 provides a TXC output on pin 34. Data transmitted from the DCE equipment to the DTE equipment is provided as RXD through transmitter 36 across the transmission line to RX1 receiver 38 as the received data RXD. This data is clocked by RXC (received clock) provided through TX2 transmitter 40 across a transmission line to RX2 receiver 42.

When the DTE equipment desires to send data back to the computer, it does so with data TXD through TX1 transmitter 44 which is received by RX1 receiver 46. This data is clocked in by the DCE equipment using a TXCE transmit clock echo signal provided through TX2 transmitter 48 and received by RX2 receiver 50. The echo clock is needed, rather than using the transmit clock, TXC, because the echo clock takes into account the transmission line delay. This insures reliable sampling of the TXD data by the DCE side.

As can be seen, the DTE mode chip 10 uses three receivers, RX1–RX3, and two transmitters TX1–TX2. On the other hand, DCE mode chip 12 uses three transmitters, TX1–TX3, and two receivers RX1–RX2. Typically, a single integrated circuit chip design is used with three transmitters and three receivers, with one of the transmitters or receivers being left unconnected depending upon whether it is in a DTE mode configuration or a DCE mode configuration.

Figure 2:
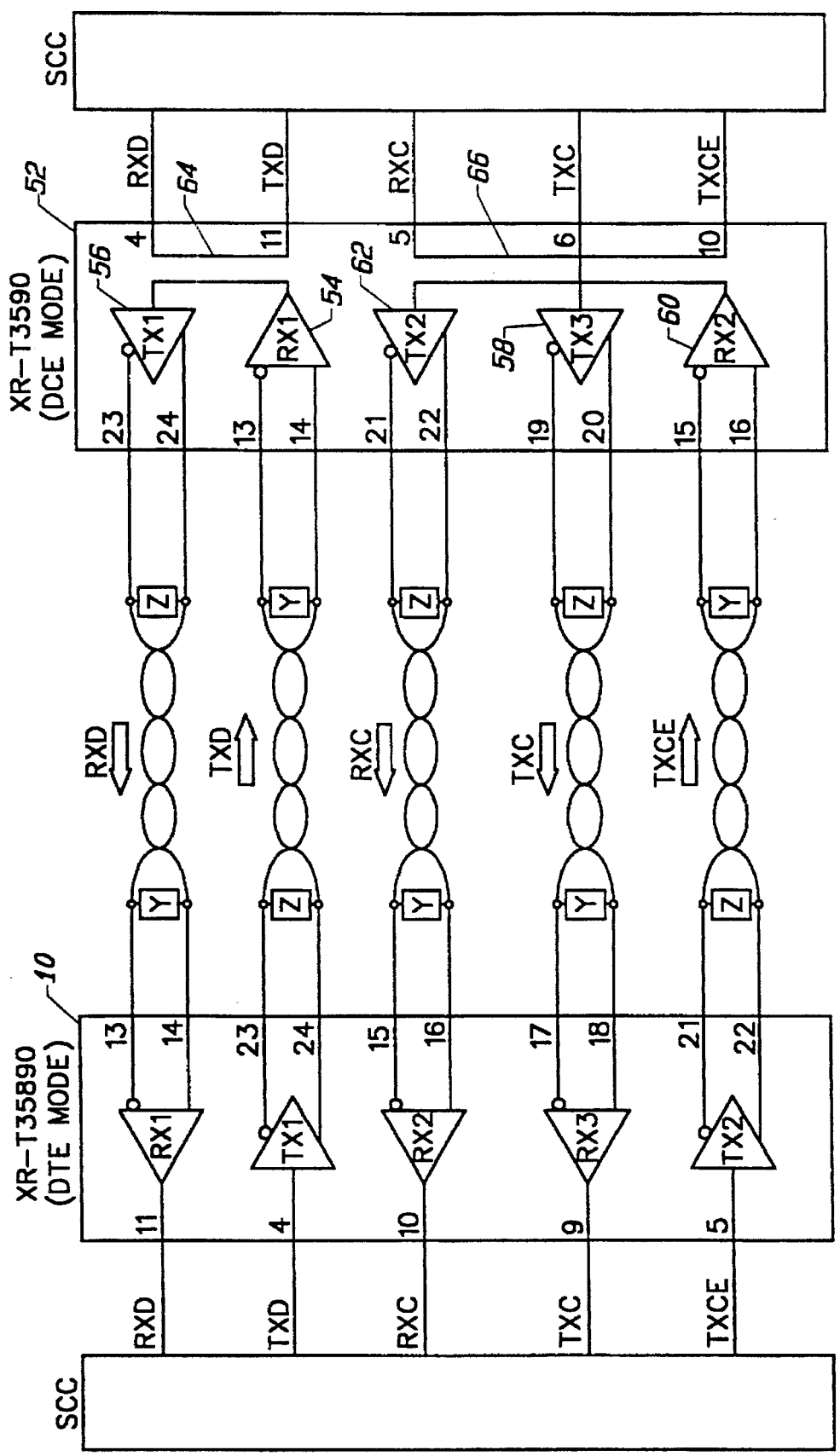
FIG. 2 is a diagram illustrating DCE diagnostics loopback using an IC according to the present invention.

FIG. 2 illustrates a DCE diagnostics loop 52 according to the present invention. In this configuration, the DTE transceiver chip 10 is connected in the same manner as in FIG.

1. However, on the DCE side, RX1 receiver 54 has its output coupled back to the input of TX1 transmitter 56. Thus, the data transmitted from the DTE can be looped back to the terminal as RXD data for diagnostic purposes. In the diagnostic configuration, the data terminal still needs to receive the transmit clock, TXC from the DCE, so TX3 transmitter 58 is configured in the same manner as in FIG. 1. However, to verify the data looped back during diagnostic mode, the clock echo signal at RX2 receiver 60 is looped back as the received clock RXC by connecting the output of receiver 60 to the input of TX2 transmitter 62. At the same time, it can be seen that the transmit data from the DCE is looped back to its received data by connection 64, while the receive clock RXC is looped back as the TXCE echo clock by a connection 66.

Figure 3:
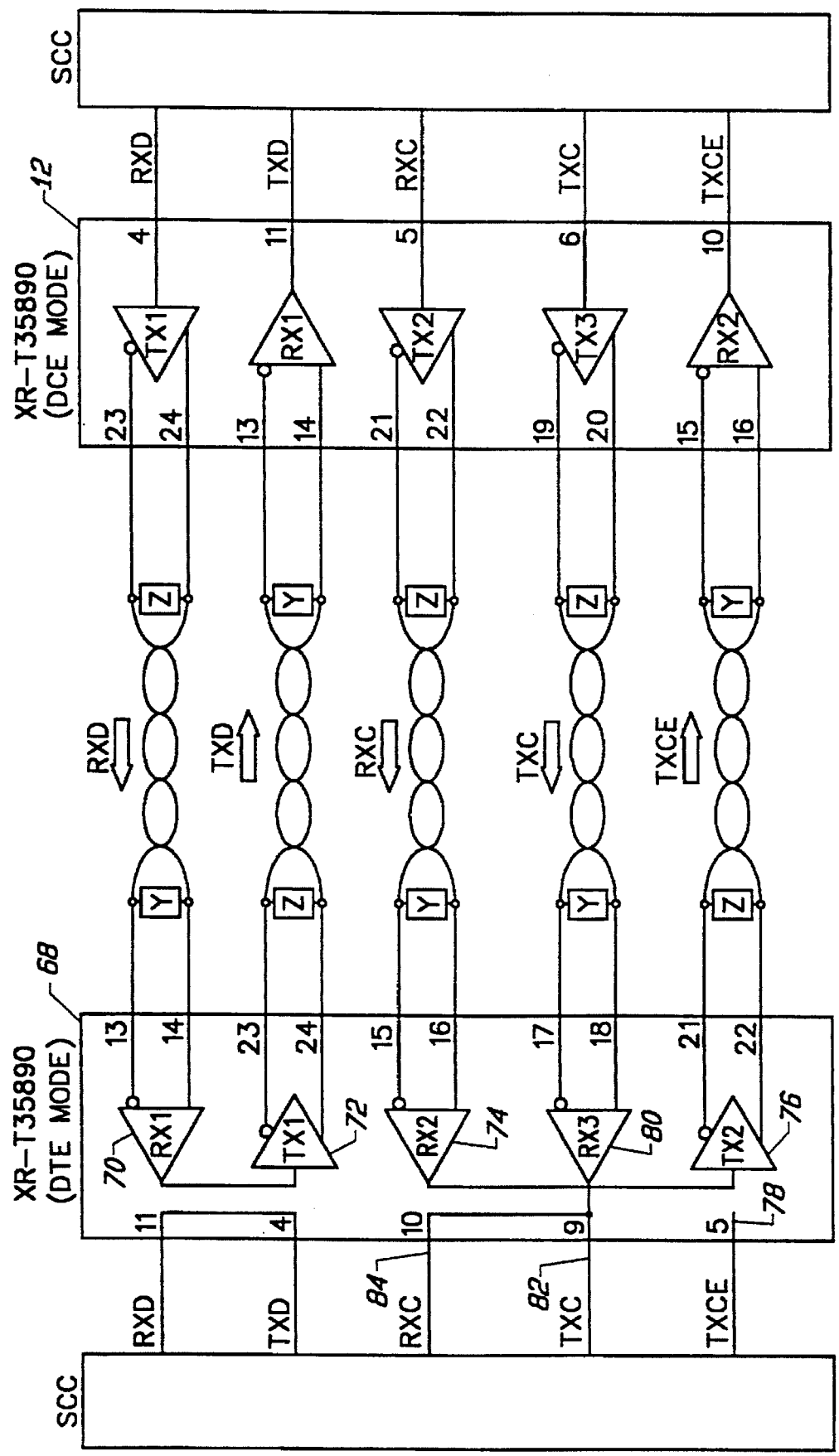
FIG. 3 is a diagram illustrating DTE diagnostics loopback using an IC according to the present invention.

FIG. 3 illustrates an integrated circuit 68 according to the present invention configured in a DTE diagnostics loopback mode. Here, the DCE mode transceiver 12 is connected in the same manner that it would be in FIG. 1. However, RX1 receiver 70 on the DTE mode chip 68 has its output connected back to the input of TX1 transmitter 72, similarly to the connection for FIG. 2. Here, however, for the clock, the receive clock RXC through RX2 receiver 74 is looped back as the clock echo by connecting the output of receiver 74 to the TX2 transmitter 76 input. At the same time, the TXCE clock echo input pin 78 is disconnected. Finally, the transmit clock, TXC through RX3 receiver 80, is connected not only to TXC output pin 82, but also to RXC output pin 84.

As can be seen, the two modes shown in FIGS. 2 and 3 require different connections depending on whether the chip is used in a DTE mode or a DCE mode.

Figure 4:
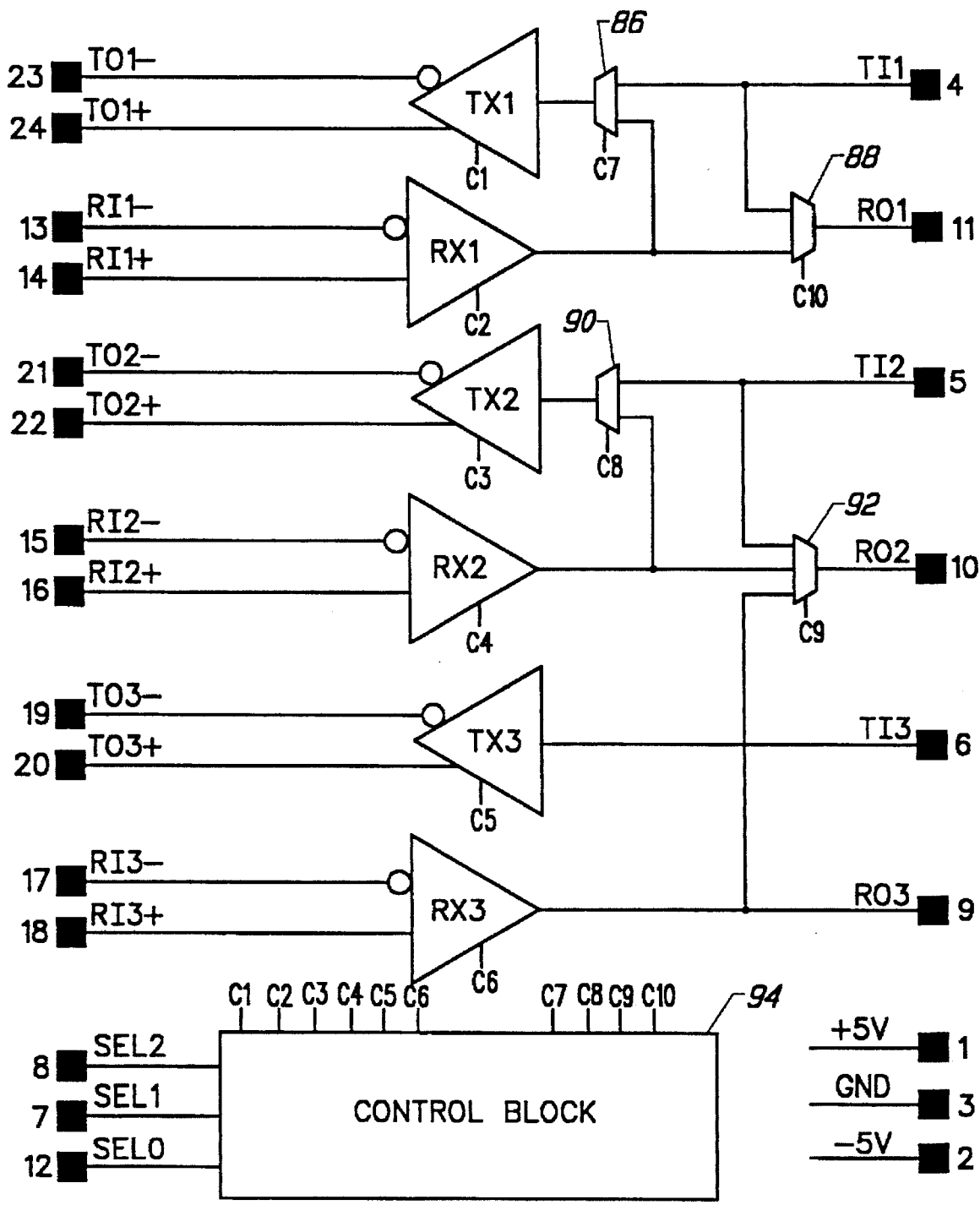
FIG. 4 is a block diagram of the transceiver with diagnostics loopback IC according to the present invention.

FIG. 4 is a diagram illustrating a preferred embodiment of a single integrated circuit chip according to the present invention which can be configured in either DTE diagnostics loopback mode or DCE diagnostics loopback mode. The chip of FIG. 4 has three transmitters, TX1–TX3 and three receivers, RX1–RX3. These designations correspond to the designations set forth in FIGS. 2 and 3, illustrating how they are differently connected depending upon whether the chip is used in DTE mode or DCE mode.

A first multiplexer 86 provides either the transmitted data TI1 or a feedback from RX1. The transmitted data is either RXD if in DCE mode, or TXD if in DTE mode. A second multiplexer 88 interrupts the RX1 output in feedback mode and connects TI1 to RO1.

A third multiplexer 90 feeds back the output of RX2 to TX2 in loopback mode. In DCE mode, RX2 is used for the clock echo signal, TXCE. In DTE mode, RX2 is used for the RXC clock signal.

A final multiplexer 92 has three possible inputs which can be selected. It can either provide the output of receiver RX2 to pin RO2, can feedback the TI2 input when in DCE diagnostics mode, or it can connect the RX3 output to this additional pin in the DTE diagnostics loopback mode shown in FIG. 3.

An optional inverter 85 is shown connected to the output of RX3, with an optional multiplexer 87 selecting between the inverted and non-inverted signal. This requires another control signal, but might be useful where an inverted transmit clock (TXC) was desired. If this option is not used, there is a direct connection between the output of RX3 and multiplexer 92 and the RO3 output pin.

A control block 94 provides the control signals for the multiplexers, receivers and transmitters. The receiver and transmitter control signals can selectively disable the outputs to put them in a high-impedance mode. Control signals C7, C8, C9 and C10 select the appropriate paths through multiplexers 86, 88, 90, 92. Select signal C9 is a two-bit signal. The particular combination of control signals is determined by select inputs SEL2–SEL0. These are the same select inputs used in a prior art transceiver chip to control enabling and disabling of the transmitters and receivers. Preferably, the DCE mode with diagnostics loopback is selected by the combination 011 for SEL2, SEL1 and SEL0. For DTE mode with diagnostics loopback, the combination 101 is used.

The transceiver of the present invention also includes the capability to disable only the transmitters, leaving the receivers enabled, with the transmitter outputs being a high impedance. This allows communication with other devices connected to the same transmission line without interference. The select sequence used for this is SEL2=0, SEL1=0 and SEL0=0, or 000.

As will be understood by those familiar with the art, the present invention may be embodied in other specific forms without departing from the spirit or essential characteristics thereof. For example, switching circuits rather than multiplexers could be used to provide the connections desired. Accordingly, the disclosure of the preferred embodiment of the invention is intended to be illustrative, but not limiting, of the scope of the invention which is set forth in the following claims.

What is claimed is:

1. An integrated circuit transceiver on a single substrate for synchronous data transmissions, said transceiver being configurable for either DTE or DCE mode, comprising:

a first transmitter having an input and a differential output for coupling to a first differential transmission line;

a first receiver having a differential input for coupling to a second differential transmission line and having an output;

a control circuit for generating a plurality of control signals, including a DCE diagnostics loopback mode control signal and a DTE diagnostics loopback mode control signal;

first switching means for coupling said first receiver output to said first transmitter input in response to said DCE diagnostics loopback mode control signal or said DTE diagnostics loopback mode control signal;

a second transmitter having an input and a differential output;

a second receiver having a differential input for coupling to a third differential transmission line and having an output;

second switching means for connecting said output of said second receiver to said input of said second transmitter in response to said DCE diagnostics loopback mode signal or said DTE diagnostics loopback mode control signal;

a third receiver having differential inputs for coupling to a fourth differential transmission line in a DTE configuration, and having an output;

third switching means for connecting said output of said third receiver to both a transmit clock I/O and a receive clock I/O in response to said DTE diagnostics loopback mode control signal; and fourth switching means for opening a connection between a transmit clock echo input pin and said second transmitter input in response to said DTE diagnostics loopback mode control signal.

2. An integrated circuit transceiver on a single substrate for synchronous data transmissions, said transceiver being configurable for either DTE or DCE mode, comprising:

a first transmitter having an input and a differential output for coupling to a first differential transmission line;

a first receiver having a differential input for coupling to a second differential transmission line and having an output;

a control circuit for generating a plurality of control signals, including a DCE diagnostics loopback mode control signal and a DTE diagnostics loopback mode control signal;

first switching means for coupling said first receiver output to said first transmitter input in response to said DCE diagnostics loopback mode control signal or said DTE diagnostics loopback mode control signal;

a first multiplexer having a first input coupled to said output of said first receiver, a second input coupled to a data transmit input pin, and an output coupled to said input of said first transmitter; and a second multiplexer having a first input coupled to said output of said first receiver, a second input coupled to said data transmit input pin, and an output coupled to a data receive output pin;

a second transmitter having an input and a differential output;

a second receiver having a differential input for coupling to a third differential transmission line and having an output;

second switching means for connecting said output of said second receiver to said input of said second transmitter in response to said DCE diagnostics loopback mode signal or said DTE diagnostics loopback mode control signal;

a third receiver having differential inputs for coupling to a fourth differential transmission line in a DTE configuration, and having an output;

third switching means for connecting said output of said third receiver to both a transmit clock I/O and a receive clock I/O in response to said DTE diagnostics loopback mode control signal; and fourth switching means for opening a connection between a transmit clock echo input pin and said second transmitter input in response to said DTE diagnostics loopback mode control signal.

3. The transceiver of claim 2 wherein the combination of said second and fourth switching means comprise:

a third multiplexer having a first input coupled to said output of said second receiver, having a second input coupled to a transmit clock input pin, said transmit clock input pin being said transmit clock echo input pin in said DCE mode, and having an output coupled to said input of said second transmitter.

4. The transceiver of claim 3 wherein said third switching means comprises:

a fourth multiplexer having an input coupled to said output of said third receiver and having an output coupled to a receive clock I/O pin; and a connection between said output of said third receiver and said transmit clock input pin.

5. The transceiver of claim 1 further comprising an inverter coupled to said output of said third receiver.

6. The transceiver of claim 1 wherein said transmitters and receivers have characteristics complying with CCITT Recommendation V.35.

7. An integrated circuit transceiver on a single substrate for synchronous data transmissions, said transceiver being configurable for either DTE or DCE mode, comprising:

a first transmitter having an input and a differential output for coupling to a first differential transmission line;

a first receiver having a differential input for coupling to a second differential transmission line and having an output;

a control circuit for generating a plurality of control signals, including a DCE diagnostics loopback mode control signal and a DTE diagnostics loopback mode control signal;

first switching means for coupling said first receiver output to said first transmitter input in response to said DCE diagnostics loopback mode control signal or said DTE diagnostics loopback mode control signal;

a second transmitter having an input and a differential output;

a second receiver having a differential input for coupling to a third differential transmission line and having an output;

second switching means for connecting said output of said second receiver to said input of said second transmitter in response to said DCE diagnostics loopback mode signal or said DTE diagnostics loopback mode control signal;

a third receiver having differential inputs for coupling to a fourth differential transmission line in a DTE configuration, and having an output;

third switching means for connecting said output of said third receiver to both a transmit clock I/O and a receive clock I/O in response to said DTE diagnostics loopback mode control signal;

fourth switching means for opening a connection between a transmit clock echo input pin and said second transmitter input in response to said DTE diagnostics loopback mode control signal; and means for setting said transmitters into a high impedance state in response to a select code of 000 for select inputs SEL2, SEL1 and SEL0.

8. An integrated circuit transceiver on a single substrate for synchronous data transmissions having characteristics complying with CCITT Recommendation V.35, said transceiver being configurable for either DTE or DCE mode, comprising:

a first data transmitter having an input and a differential output for coupling to a differential transmission line;

a first data receiver having a differential input for coupling to a differential transmission line and having an output;

a control circuit for generating a plurality of control signals, including a DCE diagnostics loopback mode control signal and a DTE diagnostics loopback mode control signal;

a first multiplexer having a first input coupled to said output of said first data receiver, a second input coupled to a data transmit input pin, and an output coupled to said input of said first data transmitter;

a second multiplexer having a first input coupled to said output of said first data receiver, a second input coupled to said data transmit input pin, and an output coupled to a data receive output pin;

said control circuit generating select signals for said first and second multiplexers to connect said first data receiver output to said first data transmitter input in response to said DCE diagnostics loopback mode control signal or said DTE diagnostics loopback mode control signal;

a second clock transmitter having an input and a differential output;

a second clock receiver having a differential input for coupling to said differential transmission line and having an output;

a third multiplexer having a first input coupled to said output of said second clock receiver, having a second input coupled to a transmit clock input pin, said transmit clock input pin being a transmit clock echo input pin in said DCE mode, and having an output coupled to said input of said second clock transmitter;

said control circuit generating a select signal input to said third multiplexer for connecting said output of said second clock receiver to said input of said second clock transmitter in response to said DCE diagnostics loopback mode signal or said DTE diagnostics loopback mode control signal, and for opening a connection between said transmit clock echo input pin and said second clock transmitter input in response to said DTE diagnostics loopback mode control signal;

a third clock receiver having differential inputs for coupling to said differential transmission line in a DTE configuration, and having an output;

a fourth multiplexer having an input coupled to said output of said third clock receiver and having an output coupled to a receive clock I/O pin;

a connection between said output of said third clock receiver and said transmit clock input pin; and said control circuit providing a select input to said fourth multiplexer for connecting said output of said third clock receiver to both a transmit clock I/O and a receive clock I/O in response to said DTE diagnostics loopback mode control signal.

\* \* \* \* \*